Dec. 7, 1971  A. G. EMSLIE  3,625,067
DEVICE FOR DETECTING ROTATION ABOUT AN AXIS
AND METHOD OF USING THE SAME
Filed July 18, 1969  2 Sheets-Sheet 1
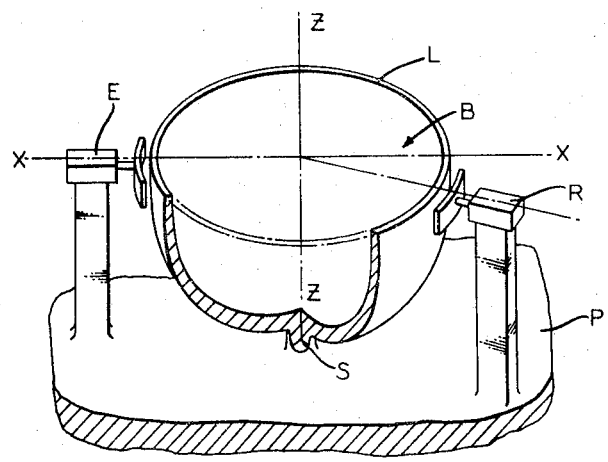
Fig.1
Fig.2
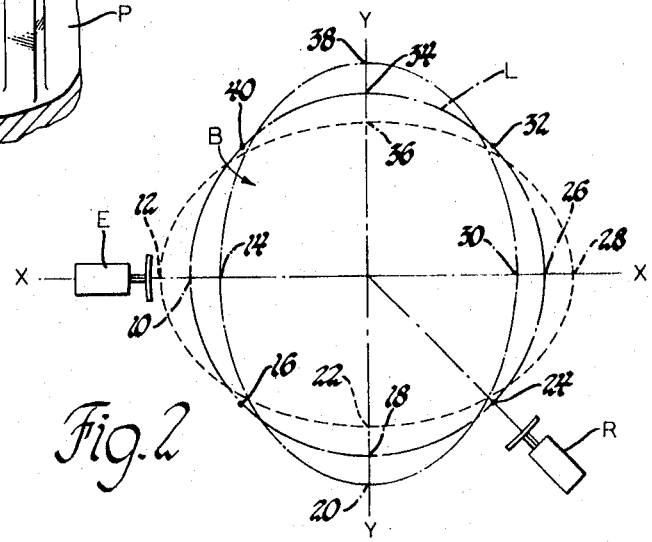
Fig.3
INVENTOR.
Alfred G. Emslie
BY
C. R. Meland
ATTORNEY

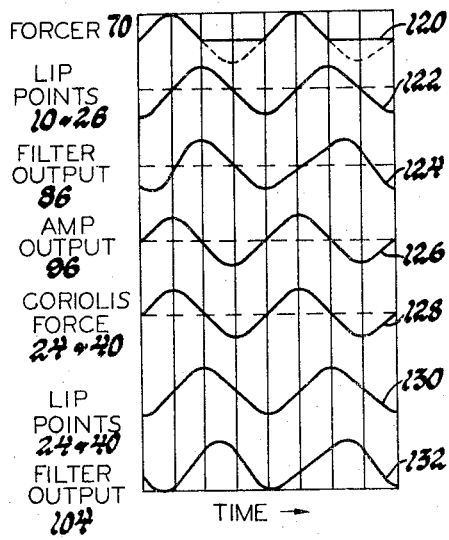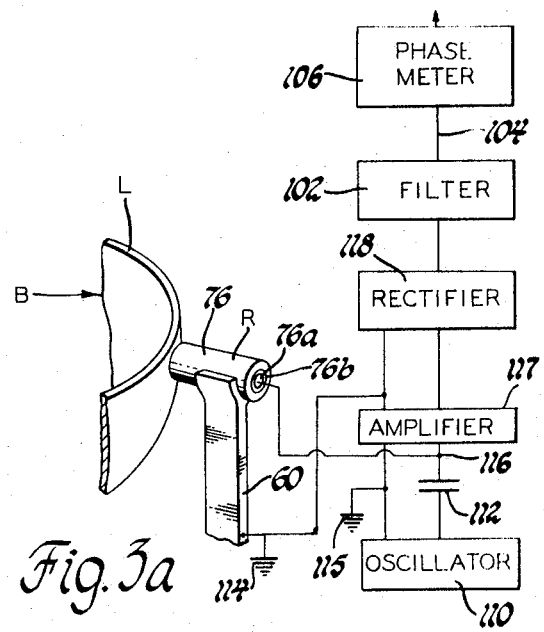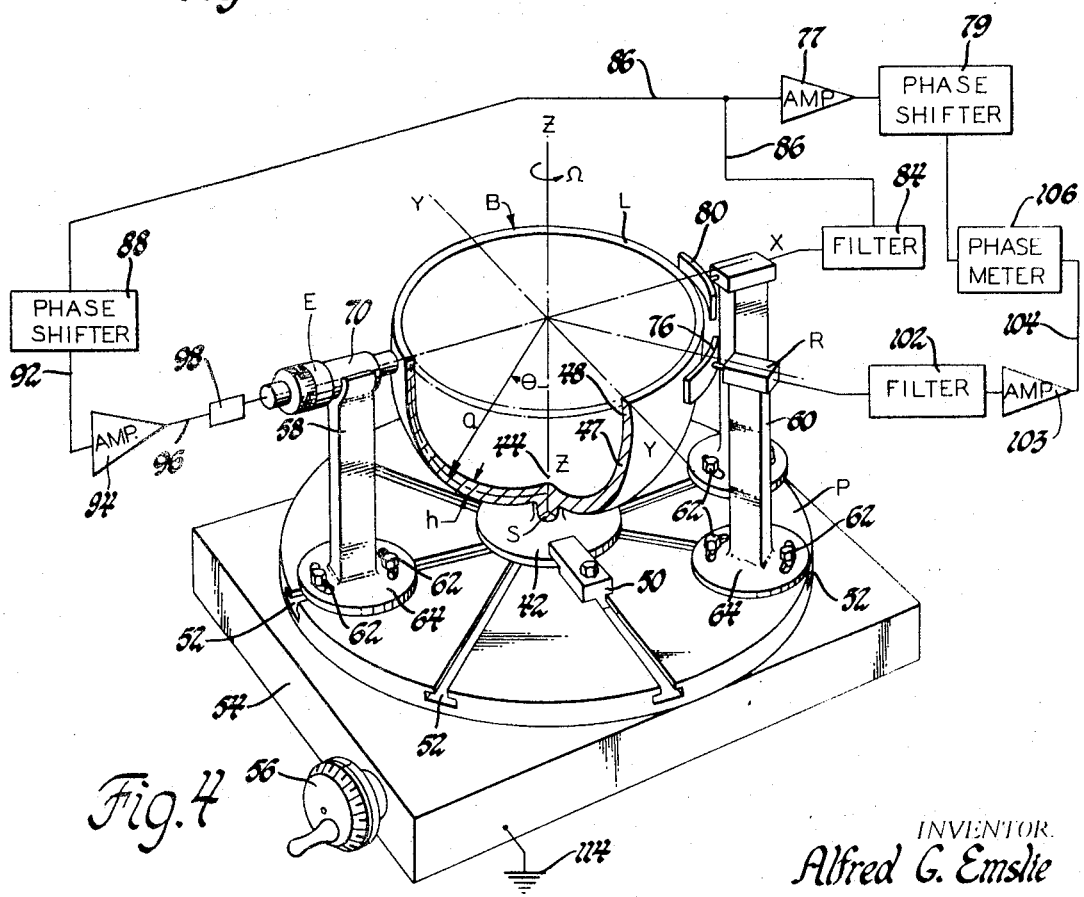

United States Patent Office 3,625,067
Patented Dec. 7, 1971

3,625,067
DEVICE FOR DETECTING ROTATION ABOUT AN AXIS AND METHOD OF USING THE SAME
Alfred G. Emslie, Scituate, Mass., assignor to General Motors Corporation, Detroit, Mich.
Filed July 18, 1969, Ser. No. 843,109
Int. Cl. G01c *19/56*
U.S. Cl. 73—505
15 Claims

ABSTRACT OF THE DISCLOSURE

A device for detecting rotation wherein radial vibrations are established in a ring-like body capable of high-Q vibration and of frequency such as to produce a standing wave pattern having spaced nodes and anti-nodes. The radial vibration amplitude at a nodal region is sensed to measure the rotation of the body. In preferred form, the body is cup-like in shape, supported on a platform by an axially positioned stem, and defines a ring-like lip capable of high-Q vibrations. Exercising vibrations in the radial mode are imparted to the lip of the device by an exerciser also mounted on the platform, and are of frequency to produce vibrations between two generally elliptical extreme shapes, giving four nodes and four anti-nodes. The sensing device is supported on the platform and is located at one of the nodes. In its preferred form, the body is made of high-Q factor aluminum alloy; its lip is about 0.025 inch thick and its diameter at the lip is about 2 inches. The frequency of the exercising vibrations is about 1600 cycles per second.

The present invention relates to a device operating by vibration imparted to a ring member on a support platform to define nodes and anti-nodes to accurately detect rotation of the support platform.

In its preferred form, the present invention uses radial exercising vibrations imparted to the lip of a bell carried by a platform. The pickup is located at a normally quiescent or nodal region as to such exercising vibrations. In the absence of platform rotation, it senses slight, if any, radial vibrations. Rotation of the platform about the axis of the bell excites radial vibrations at the pickup. These are sensed and either measured or nulled to determine the rate of platform rotation. The mechanism is relatively immune to slight variations in manufacturing dimensions and other conditions, lends itself to comparatively simple circuitry, the exercising and sensing devices are highly effective, and other advantages are attained.

A general object of the present invention is to provide a device in which radial exercising vibrations imparted to a ring shaped member carried by a platform define standing waves straddling a node and in which rotation of the platform generates radial vibrations at the node, which can be sensed to determine platform rotation and a method of utilizing the same.

It is a further object to provide an improved method and means for detecting rotation wherein low-loss radial vibrations are imparted to the lip of a bell-like member carried by a platform so as to generate radial standing waves with nodes and interposed anti-nodes and wherein changes of these vibrations at the nodes are sensed to detect rotation of the device.

Another object is to provide an apparatus of the foregoing type using a physical construction and material of the vibrating body such that a comparatively small continuous energy input gives rise to relatively large exercising vibrations, and the vibrations sensed on platform rotation are in turn relatively large in relation to the continuous energy input required to produce the exercising vibrations.

It is a further object to provide an apparatus of the foregoing type wherein the vibrating device is supported at a region where exercising vibrations are not restrained, where external vibrations, shock, etc. imparted to the platform have minimum effects on the sensed vibrations, and manufacturing tolerances, temperature, etc. have minimum influence on the device and its operation.

Another object of the present invention is to provide an apparatus of the foregoing type in which the strain associated with exercising vibration is substantially the same at substantially all points on a given radius.

It is a further and still more specific object of the present invention is to provide a method of and means for sensing rotation of a platform that uses an easily and inexpensively manufactured cup or bell-like structure made of material providing a low energy loss per cycle of radial vibration, and supported at an intersection of nodes and anti-nodes having a zero tilt and exercising displacement and also providing isolation from extraneous vibration and damping.

Still another object of the present invention is to attain a method and apparatus for sensing rotation of a platform that involves no bearings or relatively moving wearing parts, senses both direction and magnitude of the platform rotation, is relatively free from noise and interference, and in other respects is particularly suitable for use for purposes such as naviation.

The novel features which I believe to be characteristic of my invention are set forth with particularity in the appended claims. My invention itself, both as to the method and the apparatus, together with further objects and advantages thereof, will best be understood by reference to the following description taken in connection with the accompanying drawings, in which:

FIG. 1 is a view in perspective with parts broken away of a simplified representation of an apparatus in accordance with the invention;

FIG. 2 is a diagrammatic top plan view of the vibrating lip portion of the apparatus of FIG. 1, with the lip shown in the neutral and in two extreme positions, the extent of vibration being exaggerated to indicate the action more clearly;

FIG. 3 is a view of an embodiment of the invention in perspective partially broken away and with circuit elements shown schematically;

FIG. 3a is a fragmentary view of the apparatus of FIG. 3 showing more particularly a modified form of indicating system;

FIG. 4 is a view of another form of the invention in perspective partially broken and with circuit elements shown schematically; and FIG. 5 is a chart of the waveforms believed to exist at various points in the apparatus shown in FIG. 4.

GENERAL DESCRIPTION

The apparatus and method of the present invention may be understood generally by reference to FIGS. 1 and 2. The resonator or bell B, FIG. 1, is shown mounted in upstanding position on the platform P. The bell is secured to the platform at its central neck or stem portion S as shown. The bell terminates in a rim or lip L which is capable of flexing in radial in and out movement or mode in relation to the bell axis Z—Z and defines a ring about axis Z—Z. As further described, the material and dimensions of the bell are such that these radial flexing vibrations (exercising vibrations) take place in a highly efficient manner, with a small energy loss per flexing cycle in relation to the total stored energy in the system (that is, high-Q vibrations). The exerciser E drives one region in the periphery of the bell B in radial vibrations, these being along the axis X—X defined by the radius from the exerciser to the axis Z—Z. In the preferred form of the invention, these vibrations are at a frequency such as to flex the lip of the bell in and out as shown in FIG. 2, that is with a standing wave pattern defining one anti-node or loop at the exerciser E, an additional anti-node at the diametrically opposed position on axis X—X, and additional anti-nodes at right angles to these loops. The standing wave pattern, in the preferred form, additionally establishes nodes at 45 degrees in relation to the respective loops, all as indicated by the dashed lines of FIG. 2, which show the extreme positions of the lip L, and as further described below.

A pickup or responder R is located at one of the nodes of the standing wave pattern set up by exerciser E. This responder is sensitive to radial vibrations of the lip L of the bell B. Since responder R is at a node, it has little or no response when the platform P is at rest. However, when the platform P is rotated about the axis Z—Z (or is moved in any manner having a component of rotation about axis Z—Z) it has been found that the responder R senses radial vibrations, the magnitude of the vibrations being in substantial accord with the rate of rotation of the platform P. The response of the responder R accordingly indicates the rate of rotation of the platform P about the axis Z—Z or an axis parallel thereto. This response may, in accordance with conventional practice, be integrated to determine total rotation, or otherwise processed.

The method and apparatus of the present invention is believed to operate by reason of the action illustrated in FIG. 2. As shown, the lip L has a normally, unflexed, circular configuration as indicated by the solid lines of that figure. The exercising vibrations flex the lip L between the two extreme positions shown in the dotted and dashed lines, respectively, of FIG. 2. As shown, the lip L vibrates radially at region 10 between the extreme positions 12 and 14, at region 18 between the extreme positions 20 and 22, at region 26 between the extreme positions 28 and 30, and at region 34 between the extreme positions 36 and 38. These are all loops in the standing wave pattern induced by the exerciser E, which is excited at the proper frequency to generate this standing wave pattern. Intermediate these loops are the nodal regions 16, 24, 32 and 40. These are located at substantially 45 degree angular positions in relation to the axis X—X, as shown. As shown, there is substantially no radial vibration at these respective nodal regions when the platform is at rest. It will be observed, however, that as the lip bows to form the elliptical shape 12, 22, 28 and 36, the arcuate length between regions 16 and 40 and between regions 24 and 32 increases and the arcuate length between regions 16 and 24 and between regions 32 and 40 decreases. The regions 24 and 40 accordingly tend to move circumferentially in the counterclockwise direction from the neutral position and the regions 16 and 32 tend to move circumferentially in the clockwise direction from the neutral position. When the lip L assumes the opposite extreme shape defined by regions 14, 20, 30 and 38, the regions 24 and 40 tend to move circumferentially in the clockwise direction from neutral position and the regions 16 and 32 tend to move circumferentially in the counterclockwise direction from the neutral position.

Regions 16, 24, 32 and 40 thus move in the circumferential direction in response to the radial exercising vibrations imparted by the exerciser E. These circumferential movements, of course, are at the same frequency as the exercising vibrations. When the platform P is rotated about the axis Z—Z, or moves with a component of such rotation, these respective circumferential motions of regions 16, 24, 32 and 40 generate radial forces. This is believed to be due to Coriolis acceleration associated with the essentially linear circumferential vibrations and the rotational movement of the platform. The previously still regions (as to radial vibrations) move radially in vibrations of magnitude determined by the original circumferential vibrations and the angular velocity of the platform P about the axis Z—Z. It is believed that this action accounts for the fact that the responder R experiences no substantial output when the platform P is at rest and has an output when the platform P has a component of rotation about axis Z—Z.

The system thus produces a sensed signal determined by the rate of rotation about a platform axis, which is similar to the signal produced by a conventional gyroscope. The method and apparatus of the present invention can accordingly be used in navigation systems or otherwise in a manner similar to a gyroscope. However, in the method and apparatus of the present invention there are no bearings, no rotating masses, and a relatively simple, durable, and readily manufactured device is used.

DETAILED DESCRIPTION—FIG. 3

FIG. 3 shows one specific form of the apparatus of the present invention and one way to practice the process. Looking now to this figure, it will be seen that the bell B has an axis of symmetry Z—Z. It is mounted on the platform P by its own base 42. In the particular form shown, the bell B is turned from a block of 2024–T4 aluminum alloy, with the base 42 being in a plane normal to the axis Z—Z of symmetry or turning. The bell B includes a neck or stem portion S upstanding from base 42 and above stem S flares out in a generally cup-shaped configuration. This is defined by the general center area indicated at 44, the concave-convex side area indicated at 46, and the generally cylindrical rim or lip L. The bell B is formed with a generally decreased thickness when traced from the center area 44 to the lip L, as shown. The configuration is generally semispherical, that is, with the sides 46 having a generally constant radius as measured from the junction of axes X—X, Y—Y, and Z—Z. However, the lip L is of generally cylindrical shape about the axis Z—Z and is of relatively constant thickness.

The base 42 of the bell B is secured to platform P by means of T clamps 50 in radial slots 52 in platform P. Platform P is here a table mounted on support 54 and rotatable relatve thereto by a worm-wheel (not shown) and hand-crank 56 wherein the amount of such rotation is also indicated. Thus, bell B can be rotated on platform P about axis Z—Z at a rate determined by the rate of rotation of hand-crank 56.

Post 58 is upstanding from the base or platform P and positions exerciser E in registration with the lip L of bell B, as shown. Exerciser E is on axis X—X, as shown. Similarly, the upstanding post 60 on base or platform P positions the pickoff or responder R in registration with the lip L at an angle of substantially 45 degrees in relation to the X—X axis and in the plane normal to axis Z—Z.

Radial vibrations are imparted to the lip L by the exerciser E. As shown in FIG. 3, the post 58 grips and supports micrometer barrel 70a. The movable member 70b of the micrometer barrel is movable in the radial direction in relation to the lip L by rotating the knurled knob 70c. An insulating sleeve (not shown) extends about the barrel 70a in the portions gripped by the post 58 so as to electrically insulate the micrometer barrel 70a from the rest of the apparatus. The position of post 58, holding exerciser E, is adjustable relative to lip L by T bolts 62 in radially extending T slots 52 and circumferential adjustment is allowed by slots in plate 64.

The tip of the movable member 70b is in closely spaced relation to the lip L. A voltage difference between this member 70b and lip L defines an electrostatic field which draws the lip L toward the tip of the member 70b. Such voltage is applied to the member 70b in alternating voltage at a frequency substantially equal to the natural frequency of the lip L in the vibrations described above with reference to FIG. 2 (this frequency, of course, being modified by the structure of bell B as a whole and not that of the lip L, or a portion thereof, as a free body). The apparatus by which this is done is shown diagrammatically in FIG. 3. Specifically, the oscillator 90 undergoes self-oscillations at substantially the resonant frequency of the bell B, for example 1600 hertz. The output wave from this oscillator is amplified by amplifier 94 and then rectified by half wave rectifier 98. The resultant voltage applied to the tip of the member 70b is in the form of a succession of unidirectional alternate half wave pulses having a repetition rate corresponding to the natural oscillating frequency of the bell B. In operation, each pulse is in correct phase relation to reinforce the oscillations so that there is built up in the bell B exercising vibrations having an energy content and magnitude much greater than the contribution of any single driving pulse. In other words, the lip L of the bell B acts similarly to a high-Q electrical oscillating circuit.

The magnitude of the exercising oscillations is determined by the distance between the tip 70b of the micrometer 70 and the lip L as well as the magnitude of the successive voltage pulses applied to the tip 70b.

The responder R may, for example, be a distance meter of the type known as the Wayne Kerr DM100 distance meter. Such meter consists of a sensing electrode 76, FIG. 3a, which has a central insulated probe 76a. Coaxial with and insulated from this probe is a guard electrode or sleeve 76b which is clamped or otherwise mounted on post 60. The guard electrode, and probe, are insulated from post 60 by suitable means (not shown). The probe and the guard electrode extend to positions close to the lip L, as shown, so that the capacity between the probe and the L is a measure of the radial flexing of the lip in the region of the probe. The guard electrode 76b minimizes fringing effects in the field between the probe and the lip L and isolates the probe from extraneous fields. The position of post 60 holding responder R is adjustable relative to lip L by means of T bolt 62 in radially-extending T slot 52 in turntable P and circumferential adjustment is allowed by slots in plate 64.

The sensing apparatus may be shown in somewhat simplified form in FIG. 3 and in more schematical detail in FIG. 3a. As shown, the sensing apparatus may consist of an oscillator 110 operating at a suitable frequency such as 50 kilohertz, and at substantially constant voltage output to produce a carrier wave. The output of this oscillator is applied to the capacitance voltage divider defined by capacitance 112 and the capacitance to bell ground 114 from the probe 76a, as shown. Thus, as the lip L flexes and defines a varying capacity between probe 76 and ground 114, the 50 kilocycle voltage at 116 varies in magnitude, this variation being of amount determined by the magnitude of the radial flexure of the lip L and having frequency determined by the frequency of such flexure. The thus-modulated 50 kilohertz voltage at point 116 is amplified at 117 and then rectified by rectifier 118 to generate a frequency component equal to the frequency of the capacitance at probe 76a (e.g., 1600 hertz). Grounding 115 is provided as indicated to accommodate the fact that the bell B is grounded and permit the feedback required around high gain amplifier 117 by the commercial Wayne Kerr meter, above mentioned.

The filter 102 is a relatively narrow band pass filter for the exercising frequency (e.g., 1600 hertz), so that the output of filter 102 on conductor 104 is a sine wave that has instantaneous amplitude determined by the radial vibration of the lip L. This wave is sensed and indicated by meter 106. Meter 106 may for instance be of a type known as a "Phazor" phase sensitive demodulator operative to indicate the phase and magnitude of a varying unknown signal relative to a reference. Meter 106 in the present embodiment provides a signal proportional to the rate of rotation of platform P about axis Z—Z and having a positive or negative sense in accordance with a clockwise or counterclockwise sense of rotation of platform P.

For purposes of adjustment, it is desirable to provide an indication of the magnitude of the output of filter 102 in relation to the output of oscillator 90. As shown in FIG. 3, this can be done by applying the output of filter 102 to dual beam oscilloscope 119. One beam responds to the output of the oscillator 90 on conductor 92. The other beam responds to the output of filter 102 so that the magnitudes of the respective oscillations may be readily observed. With the post 60 in a position spaced from the node, so that the probe 76b responds to exercising oscillations, the frequency of the oscillator 90 can be varied while observing the magnitudes of the waves from filter 102 and from oscillator 90 on the oscilloscope. By adjusting the frequency for maximum output from filter 102 the oscillator 90 can be adjusted to achieve the natural frequency of the bell B. Having made this adjustment, it is then possible to move the post 60 circumferentially until the output from filter 102 substantially disappears. This indicates that the nodal region has been reached. The output of filter 102 can then be observed to determine rotation about axis Z—Z.

DETAILED DESCRIPTION—FIG. 4

FIG. 4 shows modification of the exercising apparatus by which the proper exercising frequency is automatically attained. In this apparatus, the parts corresponding to those of FIG. 3 are shown by like reference numbers. As shown, there is additionally provided a pickup 80 in diametrically opposed relation to the exerciser E. Pickup 80 may, for example, be the same construction as the responder R described above in relation to FIG. 3 and be excited with a carrier wave in similar manner. Pickup 80 produces an output voltage at line 86 from filter 84 (corresponding to filter 102, FIGS. 3 and 3a). This voltage has instantaneous value determined by the radial position of the lip L at the point 26. This sinusoidal voltage is shifted about 90 degrees by phase shifter 88 and applied via conductor 92 to amplifier 94 which in turn energizes rectifier 98 via conductor 96 and thence the drive electrode 70 of exerciser E. This drive electrode is of the same construction as above described with reference to FIG. 3. It will be observed that a feedback loop can be traced from exerciser E through the lip L to the pickup 80 and thence through filter 84, phase shifter 88, amplifier 94 and rectifier 98 back to the exerciser E. This self-oscillating structure has a natural oscillating frequency determined largely by the natural mechanical frequency of the lip L for radial oscillations. The loop gain, defined by exerciser E, the pickup 80, filter 84, phase shifter 88, amplifier 94 and rectifier 98 fixes the amplitude of the oscillations, which is a constant value so long as the gain is maintained constant.

In the apparatus of FIG. 4, one input to phase meter 106 is energized from the output of filter 102 through amplifier 103, and the other input is energized from the output of filter 84 through amplifier 77 and phase shifter 79. Phase shifter 79 is adjusted to provide a substantially quadrature phase relation between the two inputs when the bell B is not rotating. The filter 102 and amplifier 103, FIG. 4, produce a substantially sine wave at the exercising frequency, when the bell B is rotated about axis Z—Z. This signal is supplied to phase meter 106. This meter also receives the exercise frequency sine wave from filter 84, line 86, amplifier 77, and phase shifter 79. The latter is adjusted to provide a signal at the second input to phase meter 106 that is substantially in phase or substantially 180° out of phase with the signal from filter 102 and amplifier 103, when the bell is rotated about axis Z—Z.

The meter 106 measures the in-phase component of the signal from amplifier 103 in relation to the shifter 79. When the bell B is rotated about axis Z—Z in one direction, this component increases in positive senses. When the bell B is rotated about axis Z—Z in the other direction, this component increases in negative sense. Thus, through the phase comparison, the unit serves to measure both the direction and the magnitude of the rotation of the bell B. In addition, the extraneous signals in the pickup 76 at exercising frequency tend to be in quadrature with the signals due to rotation of the bell B, and such quadrature signals are not sensed by the phase meter 106. They do not, therefore, appear in the indicated output thereof. The phase meter 106 is also relatively insensitive to extraneous signals that are not at the exercising vibration frequency, given an additional freedom from background noise.

The general cooperation of the loop components of FIG. 4, for initiating and maintaining exercising oscillations of lip L, will now be described with reference to the wave forms of FIG. 5, which show on a common time scale the general wave shapes encountered. With bell B initially not exercising, but with the feedback loop described above closed around it and energized, an initial change from the quiescent condition due to shock or otherwise is picked up by pickup 80, amplified, and reapplied to forcer 70. This action continues in positive sense and continues until the loop gain decreases to the value that just maintains the oscillations. That is, at startup loop gain is large, and any oscillations detected by electrode 80 are amplified so as to result in a potential at electrode 70 that further increases the amplitude (due to the loop gain). The amplitude of the forcing potential on electrode 70, the flexure at lip regions 10 and 26 (FIG. 2), and the pickoff amplitude on electrode 80, progressively increase due to this until a point is reached where the loop gain falls. The result is that a series of drive pulses are applied to electrode 70 to build up the desired exercising oscillations at the natural frequency of the bell B.

When exercising occurs, the forcing signal on electrode 70 is successive unidirectional pulses 120, FIG. 5. The radial movements at lip regions 10 and 26 are as shown at waveform 122. In other words, the attractive force is first applied to lip region 10 when it is at its perigee 14. The attractive force ends when the lip region 10 goes through its neutral position and overshoots to its opposite apogee 12, where further drive force is blocked for the next half cycle by rectifier 89. The lip L then moves back to the region 14 under the mechanical action of the bell.

As described above, the output 86 of filter 84, FIG. 4, has an instantaneous value determined by the position of the lip L in relation to the pickup 80. This waveform is shown at 124, FIG. 5, and is an alternating voltage substantially in phase with mechanical vibration wave 122. Similarly, the output 126 of amplifier 94 (which is rectified by rectifier 98 to produce the alternate half wave drive pulses 120) is this same wave shifted by phase shifter 88, as shown in FIG. 5. The circumferential movements of regions 16, 24, 32 and 40, FIG. 2, are in unison with the radial flexing of the lip L, and the radial force produced by Coriolis acceleration is in phase with such circumferential movement and in accord with the angular velocity about axis Z—Z. The Coriolis force on the regions 24 and 40 when the platform is rotated varies as shown by the wave 128. The resulting radial movements at regions 24 and 40 are of like frequency but phase shifted as shown by curve 130, FIG. 5. These movements are in turn sensed by the responder R to produce the output voltage wave at filter 102 as shown in curve 132, FIG. 5.

For best utilization of the process and apparatus of the present invention, the structure and operating conditions should be optimized. To afford maximum readout sensitivity from pickoffs 76 and 80, for example, maximum flexing amplitude of sides 46 of the bell B and the lip L is desirable, and the movements of the lip should have maximum amplitude while keeping the strain within the elastic limits of the materials comprising the bell B. The latter consideration in turn makes it desirable that the elastic limit of the material be as high as possible, consistent with material stability and the Q factor, the latter to be discussed shortly. This maximum flexure for a given strain level is accomplished mainly by the bending action, here of sides 46 about stem S. It has been found that this amplitude may be maximized by using the maximum practical radius "$a$," FIG. 4, and minimum side thickness "$h$," FIG. 4.

To maintain the oscillation of the bell B, as hereinbefore described, requires the repetitive application of energy to sides 46 without allowing the amplitude of this force to cause the elastic limit to be exceeded. The energy input per flexing cycle is preferably minimized, not only minimize the power consumption of the device but also to maximize its signal to noise ratios by requiring less force to null the effects of electronic noise and misaligned pickoffs and forcers. Such effects might otherwise be interpreted as input-caused signals. It is desirable to select the material to have a maximum Q. By Q, I refer to the ratio of the energy stored in the oscillating system to the energy dissipated in one cycle. Materials that exhibit favorable Q's, elastic limits, and moduli of elasticity, and yet are readily machinable, include aluminum alloys such as 2024-T4. This has generally 93.4% aluminum, 4.5% copper, 1.5% magnesium, and 0.6% manganese. Also silicon-aluminum bronze or "Everdur" alloys, having 96% copper, 3% silicon and 1% manganese or 91% copper, 7% aluminum and 2% silicon have favorable properties.

The bell B shown in FIG. 1 is preferably constructed from 2024-T6 aluminum having a modulus of elasticity E of $10.6 \times 10^6$ p.s.i. and a Q of 3,000 in air, 3,100 in helium and up to 12,000 in a $10^{-2}$ torr vacuum. It is tuned to have a natural frequency of 1,600 hertz along both the X axis and the 45° pickoff axis with a difference of 0.03 hertz or less. In the preferred cross section of the invention, shown in FIG. 3, side 46 is comprised of a cylindrical rim section 48 contiguous with a spherically-arcuate section 47 both of which have a mean radius "$a$" of 1 inch. The thickness of sides 46 in arcuate region 47 varies from maximum $h_0$ in the center region 44 to some finite thickness $h$ in accordance with the formula $$h = \frac{h_0}{4}(1+\cos\theta)^2$$

where $\theta$ is the spherical angle subtended from the polar axis through center 44. This thickness contour is believed to provide a uniform peak strain throughout the bell. The rim 48 is of constant thickness $h_0/4$, here approximately 0.025 inch and of axial length along axis Z—Z approximately 0.25 inch. This rim is believed to increase the momentum of lip L to afford increased deflection thereof when acted upon by the Coriolis forces mentioned above.

The pickoffs 76 and 80 and forcer 70 used with the FIG. 4 configuration, for example, are 0.080 inch diameter capacitive electrodes located 0.001 inches radially from lip L (when the lip L is in neutral position). The signal from amplifier 94 is 2,230 volts zero to peak and the signals from pickoffs 76 and 80 have sensitivities of 230 millivolts per 0.001 inch deflection. Moreover, with the configuration shown in FIG. 4, outputs detected are linear with input rotation up to 25 degrees per second.

The nodes 16, 24, 32 and 40 and the loops at 12, 20, 28 and 38 may be traced axially down the bell B toward center area 44, where they intersect and where the resulting motions, both radial and tangential, are substantially zero. The stem S thus does not interfere with the exercising oscillations, and environmental vibrations at the support (and communicated to the stem S) do not tend to be sensed by the pickups. The most important constructional feature of bell B is that it be shaped symmetrically about the axis Z—Z and be supported in the region or center 44 on this axis. This symmetry is obtained with relative ease by normal machining techniques.

The system may be excited at higher frequencies so as to create a greater number of loops and nodes, for instance 6 or even 8 instead of the 4 here shown for $n=2$. This produces sets of loops and nodes spaced about the circumference at angular distances from each other of $180/n$ degrees, where $n$ is the number of loops or nodes in 180°. The resulting vibration pattern will then have loops separated from nodes by $180/2n$ degrees.

While I have shown and described specific embodiments of the present invention, it will be understood that many modifications and alternative constructions may be used without departing from the true spirit and scope of the invention. I therefore intend by the appended claims to cover all modifications and alternative constructions falling within their true spirit and scope.

In the operation of all forms of the present invention above described, it is desirable to design the medium to provide a relatively small energy input per cycle of the exercising oscillation in relation to the stored energy. This has the advantage of requiring minimum input energy. In addition, it is desirable for the magnitude of the oscillations to be substantially constant over any short period of time when the effects of rotation of the platform are to be measured. These considerations make it desirable to provide "high-Q" oscillations and the incident long ringing time. The principal factors that influence the ratio of stored energy to energy input per cycle (Q) are (a) the shape of the medium, (b) the modulus of elasticity of the medium material, (c) the density of the material of the medium and (d) the loss-factor of the material in the exercising flexure. As above described in the case of the bell, the thickness of the bell preferably increases when traced from the lip to the axis so as to provide a substantially constant bending strain throughout the surface of the material. The modulus of elasticity of the bell material should be as great as possible, so that high-amplitude oscillations are possible within the elastic limit and with minimum energy losses. The density of the material of the bell determines the stored energy when in motion and the frequency and momentum of the oscillations, and should be a large as practical. Also, the energy losses of the material while flexing, sometimes referred to as the loss-factor, determines the energy loss per cycle and should be as low as possible. As above described, I have found that aluminum alloy 2024–T4 and Everdur alloys provide these various characteristics, although it should be understood that these are exemplary materials and that other materials may be used.

In the foregoing description and the appended claims I have used the term "bell" to describe generally a member having a ring portion and extending in a concave-convex configuration to a center point. Such member may be cup-like as herein specifically described, may be flared at the lip like a ship's or church's bell, or may even be in doubled form to define a sphere-like shape. In all of these shapes, a resilient ring portion capable of radial vibrations is provided and may be supported at the junction of the nodes and anti-nodes as described above. Moreover, in the foregoing description, emphasis is placed on the most significant vibrations involved. The lip L in fact is believed to undergo complex vibrations in many modes, including radial, circumferential, and axial, all of which are coupled to some extent and may be detected. The practical operation and advantages of the apparatus, however, are believed to be essentially due to the described vibrations.

Finally, various hollow or solid mediums may be used in lieu of the specific bell members here disclosed, so long as imparted radial vibrations in relation to an axis generate a vibration pattern with substantially null regions as to such vibrations and rotation about the axis generates radial vibrations at such null regions through interaction with the imparted vibrations. In addition to rings and bells as hereinbefore described, hollow or even ball-type mediums wherein the radial vibrations are caused by substantially bending-type flexing action may be used. Moreover, even though the vibrations therein are caused by the compression or shear action and therefore may not be as pronounced as with hollow or shell-type mediums, solid mediums such as disks, eight-sided crystals, and irregularly-perimetered plates mass-balanced along the directions of vibration utilized may be used, as long as the medium is capable of sustaining the vibrations, as described above.

What I claim as new and desire to secure by Letters Patent of the United States is:

1. A sensing instrument comprising in combination:
 (a) a platform;
 (b) a bell-like member having an axis of substantial symmetry, and concave and convex faces substantially symmetrical about said axis, the bell-like member being affixed to said platform in the region of the axis, defining a lip in a plane substantially normal to the axis, and being capable of ringing vibrations at said lip in directions radial to said axis;
 (c) means to impart forced exercising radial vibrations to said lip at one radial region thereon, said vibrations establishing a standing wave pattern about the peripheral edge with at least one node located between a pair of loops; and,
 (d) sensing means responsive to radial vibrations of the peripheral edge in the region of said node, the same being induced in response to rotation of the platform about an axis parallel to said axis.

2. An instrument to sense rotation about an axis comprising in combination:
 (a) a platform having an axis;
 (b) an annular member carried by said platform and defining a closed circumferential path about said axis, said member being capable of radial ringing oscillations in relation to said axis;
 (c) exerciser means supported by the platform and positioned to impart radial harmonic motions to said member at one region thereon, the frequency of said motions being such as to generate radial standing waves about said path, with at least two nodal regions thereon disposed angularly about said axis in relation to the point at which said motions are imparted; and
 (d) a sensor supported by the platform and responsive to radial harmonic motions at said nodal region, whereby with the platform at rest the sensor is substantially quiescent and when the platform is rotating about said axis the sensor responds to the radial vibrations thereby induced at said nodal region to indicate the presence of such axial rotation.

3. In the apparatus of claim 2, two of said nodal regions having loci defining a common intersection to which said platform is connected.

4. A gyroscope-like sensing apparatus comprising in combination:
 (a) a platform;
 (b) a ring-defining member on the platform and encircling an axis, said member being of material and dimensions enabling the same to execute low energy loss radial vibrations;
 (c) exerciser means fixedly mounted on the platform and positioned to impart radial vibrations to the member at one region thereon, the frequency of the vibrations being such as to generate standing waves extending circumferentially about said member, and nodes therebetween; and,
 (d) sensing means fixedly mounted on the support and positioned to respond to radial vibrations at a node, whereby the vibrations sensed by said device vary in accordance with rotations of the platform about said axis.

5. The method of sensing movement about a predetermined axis comprising the steps of:
 (a) imparting radial exercising vibrations to a low-loss radially resilient member encircling the axis, the frequency of the vibrations being such as to establish a standing wave pattern extending circumferentially about the axis with circumferentially spaced loops and circumferentially spaced nodes; and, (b) sensing the magnitude of the radial vibrations of said member in the region of a node to determine the rotation thereof about the axis.

6. The method of sensing movement about a predetermined axis comprising the steps of:

(a) imparting radial exercising vibrations to a low-loss radially resilient member encircling the axis, the frequency of the vibrations being such as to establish a standing wave pattern extending circumferentially about the axis with circumferentially spaced loops and circumferentially spaced nodes;

(b) sensing the radial vibrations of said member in the region of a node; and, (c) measuring the in-phase component of the last-mentioned vibrations in relation to a like-frequency signal in quadrature therewith when the member is not rotating about the axis, whereby the direction and magnitude of rotation of the member about the axis is determined and noise interference is minimized.

7. A gyroscope-like sensing apparatus comprising in combination:

(a) a platform;

(b) a bell-like member having an axis of symmetry, defining a stem on said axis of symmetry, and supported from the platform through the stem, said bell-like member further defining a lip spaced from the stem, symmetrical about said axis, and capable of radial vibrations in relation to the axis;

(c) an exerciser mounted on said platform and effective when energized to deflect one region on the lip in radial direction in relation to the axis so as to define a standing wave pattern having a plurality of loops circumferentially spaced about the rim and nodes located therebetween;

(d) means to energize the exerciser in successive energy pulses so as to generate said radial vibrations; and, (e) a responder mounted on said platform and effective to sense radial vibrations of the lip at a nodal region thereon, whereby the responder senses such vibrations when the platform rotates about said axis.

8. A gyroscope-like sensing apparatus comprising in combination:

(a) a platform;

(b) a bell-like member having an axis of symmetry, defining a stem on said axis of symmetry, and supported from the platform through the stem, said bell-like member further defining a lip spaced from the stem, symmetrical about said axis, and capable of radial vibrations in relation to the axis, the bell-like member being formed of a material having density, modulus of elasticity, loss factor, and dimensions providing high-Q radial oscillations of said lip;

(c) an exerciser mounted on said platform and effective when energized to deflect one region on the lip in radial direction in relation to the axis so as to define a standing wave pattern having a plurality of loops circumferentially spaced about the lip and nodes located therebetween;

(d) means to energize the exerciser in successive energy pulses so as to generate said radial vibrations; and (e) a responder mounted on said platform and effective to sense radial vibrations of the lip at a nodal region thereon, whereby the responder senses such vibrations when the platform rotates about said axis.

9. A gyroscope-like apparatus to sense rotations of a platform about an axis, comprising in combination:

(a) a bell-like member hvaing an axis of symmetry parallel with said first mentioned axis, defining a stem on said axis of symmetry, and supported from the platform through the stem, said bell-like member further defining a lip spaced from the stem, symmetrical about said axis, and capable of radial vibrations in relation to the axis, the bell-like member being formed of a material having density, modulus of elasticity, loss-factor, and dimensions providing high-Q radial oscillations of said lip;

(b) means supported by said platform defining an electrode in spaced relation to the lip at one region thereon and radially spaced therefrom;

(c) means generating a series of voltage pulses at said electrode and of repetition rate imparting radial oscillations to the lip, so as to define a standing wave pattern having a plurality of loops circumferentially spaced about the lip and nodes located therebetween;

(d) means supported by said platform defining a second electrode in spaced relation to the lip at one of the nodes thereon and radially spaced therefrom; and, (e) means responsive to the capacitance between said second electrode and the lip to sense rotation of the platform about said axis.

10. A gyroscope-like apparatus to sense rotations of a platform about an axis, comprising in combination:

(a) a bell-like member having an axis of symmetry parallel with said first mentioned axis, defining a stem on said axis of symmetry, and supported from the platform through the stem, said bell-like member further defining a lip spaced from the stem, symmetrical about said axis, and capable of radial vibrations in relation to the axis, the bell-like member being formed of material having density, modulus of elasticity, and dimensions providing high-Q radial oscillations of said lip; the bell-like member further having a progressively increased thickness when traced from the lip to the stem;

(b) means supported by said platform effective when energized to deflect one region on the lip in radial direction in relation to the axis so as to define a standing wave pattern having a plurality of loops circumferentially spaced about the lip and nodes located therebetween;

(c) means to energize the exerciser in successive energy pulses so as to generate said radial vibrations; and, (d) a responder mounted on said platform and effective to sense radial vibrations of the lip at a nodal region thereon, whereby the responder senses such vibrations when the platform rotates about said axis.

11. A device to sense rotations of a platform about an axis comprising in combination:

(a) a bell-like member symmetrical about said axis and supported from said platform on said axis, and defining a lip spaced therefrom, the member being made of material having modulus of elasticity, density, loss-factor, and dimensions providing high-Q radial oscillations of said lip, said member further having progressively increased thickness when traced from the lip to said axis;

(b) means defining a first electrode defining a capacitance in relation to said lip that varies in accordance with radial movement of said lip;

(c) means imparting successive voltage pulses to the electrode to generate successive radial force pulses thereon at a frequency creating four standing waves of radial vibration thereon and four interposed nodal regions thereon;

(d) means defining a second electrode defining a capacitance in relation to said lip that varies in accordance with radial movement of said lip at one of said nodal regions; and, (e) means responsive to said last mentioned capacitance to indicate the existence of rotation of said platform about said axis.

12. An instrument to sense rotation of a platform about a predetermined axis, comprising in combination:
   (a) a platform;
   (b) a high-Q member carried by said platform and defining a perimeter about said axis, said member capable of sustaining therein a vibration pattern with a substantially-null region when vibrated along a first direction radial to said predetermined axis and angularly separated thereabout from said null region and generating at said null region and along a second direction radial to said axis vibrations excited by the rotation of said member about said predetermined axis and the effects of said vibrations along said first radial direction;
   (c) an exerciser carried by the platform and positioned to impart radial vibrations to said member on said perimeter along said first direction; and,
   (d) a sensor carried by the platform and responsive to vibrations at said null region along said second direction, whereby with the platform at rest the sensor is substantially quiescent and with the platform rotating about said axis the sensor responds to radial vibrations at said null region along said second direction to indicate the presence of such axial rotation.

13. The method of detecting movement of a high-Q member about a predetermined axis therethrough, said method comprising the steps of:
   (a) flexing an annular member by applying repetitive forces thereto along a first direction radial to said predetermined axis the frequency of such forces being substantially the natural frequency of such member, thereby imparting to said member a flexural vibration pattern with relatively quiescent regions, said quiescent regions disposed about said axis with respect to said first direction by an angle substantially $180/2n$ degrees and odd multiples thereof, where $n$ is the number of quiescent regions produced in said pattern in 180 degrees; and
   (b) sensing along a second direction radial to said axis and at one of said quiescent regions, flexural vibrations excited thereat by the interaction of movement of said member about said axis and the effects of said vibrations along said first direction.

14. A device for sensing rotation about a predetermined axis comprising:
   (a) a platform;
   (b) a high-Q bell-like member having sides substantially symmetrical about the predetermined axis and defining a lip;
   (c) forcing means acting repetitively on said lip to flex said lip in first vibrations radial to said axis, the pattern of said vibrations having substantially nodal regions in the absence of rotation of said platform and the loci of at least two of said nodal regions defining a common intersection on said member;
   (d) support means connecting said member to said platform at said intersection; and
   (e) sensing means located adjacent said lip at one of said null regions and responsive to second vibrations in said lip resulting from said first vibrations and the rotation of said platform about said axis to sense said rotation.

15. The method of detecting the rotation of a platform about a predetermined axis through the center region of a bell-like member the sides of which may be flexed about the center region to generate a standing wave pattern extending circumferentially about the sides and having nodal and anti-nodal regions, the loci of at least two of which intersect in said center region and the positions of which are defined about said axis when the platform does not rotate, said method comprising the steps of:
   (a) supporting said member from said platform at said center region, said sides thereby encircling said axis;
   (b) repetitively flexing a first region on said sides with respect to said center region, thereby generating said pattern; and
   (c) sensing at one of said nodal regions displacements excited thereat by the interaction of the rotation of said platform about said axis and the effects of said flexing of said first region, whereby the rotation of said platform about said axis may be detected.

References Cited

UNITED STATES PATENTS 3,307,409   3/1967   Newton, Jr. _____ 73—505

OTHER REFERENCES

An article by G. H. Bryan from pages 101–107 of vol. 7 of the "Proceedings of the Cambridge Philosophical Society," Nov. 24, 1890.

JAMES J. GILL, Primary Examiner